July 5, 1960  D. D. PLATT  2,943,752
BULK FEED BIN

Filed June 30, 1959  2 Sheets-Sheet 1

INVENTOR
D. D. PLATT
ATTORNEY

July 5, 1960

D. D. PLATT 2,943,752

BULK FEED BIN

Filed June 30, 1959

2 Sheets-Sheet 2

INVENTOR
D. D. PLATT

BY
ATTORNEY

United States Patent Office 2,943,752
Patented July 5, 1960

2,943,752

BULK FEED BIN

Donald D. Platt, Orlando, Fla., assignor to Farmers Cooperative Exchange, Pinecastle, Fla., a corporation of Florida Filed June 30, 1959, Ser. No. 824,018

3 Claims. (Cl. 214—17)

This invention relates to the containing and dispensing of materials including bulk feed supplied to livestock on dairy farms and in other places and to bins or other structures employed for the storage and dispensing of such materials.

The invention is directed specifically to a bulk feeder of the general nature of a bin or silo designed to hold a mass or mixture containing one or more sticky ingredients such as molasses or the like which causes the material to stick together and to the walls or other parts of the structure with which it comes in contact, thereby presenting a problem in the dispensing of such mixture.

Prior structures in which feed for livestock and other substances containing a sticky ingredient have been stored have not been satisfactory because of the difficulty of discharging the material therefrom, and attempts have been made to design and produce structures which solved the difficulty, including with spouts through which the sticky material could be readily discharged. However such attempts have been unsuccessful.

It is an object of the invention to overcome the difficulties enumerated and to provide a simple and inexpensive upright bin or container for bulk feed or other material having incorporated therein a sticky substance or ingredient and from which bin or container the discharge of the required quantity of material can be readily accomplished, as well as a structure of the character indicated which can be easily and quickly produced from readily available materials.

Another object of the invention is to provide a bulk feed bin capable of being erected in close proximity to a barn or other structure and with the use of a dispensing trough of a proper length to discharge material in a desired location.

A further object of the invention is to provide a bulk feed bin in which feed containing a sticky substance can be contained and readily dispensed and with the control of the dispensing being either manual or automatic in order to maintain a supply of feed available at all times and with such device electronically actuated and controlled.

Figure 1:
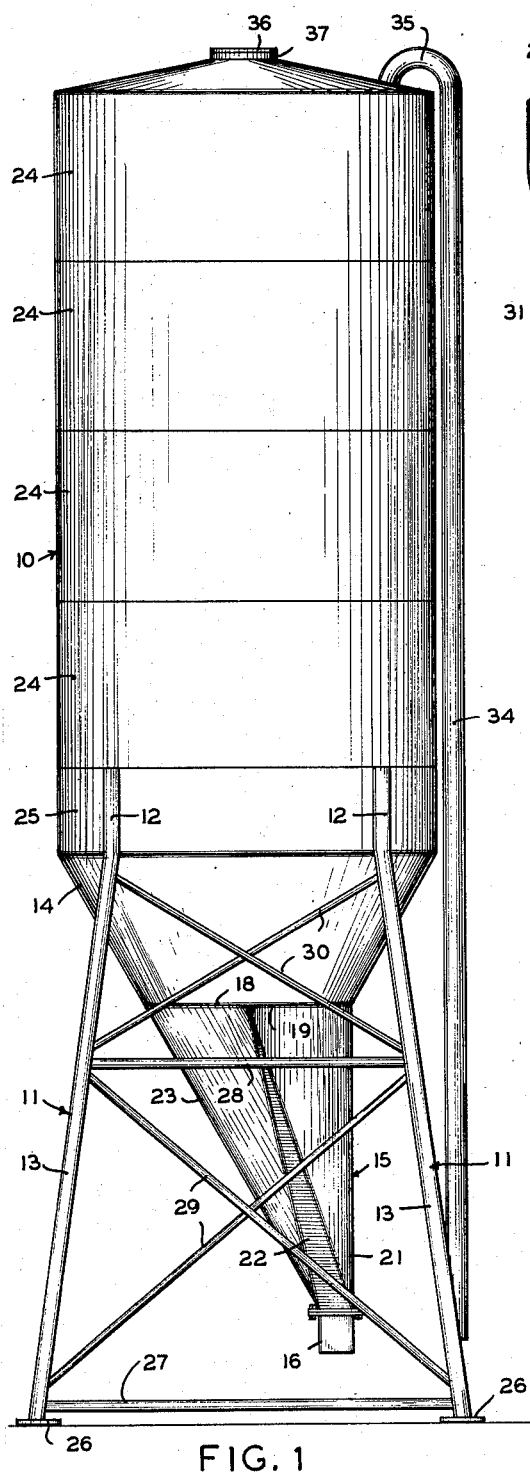
Figure 5:
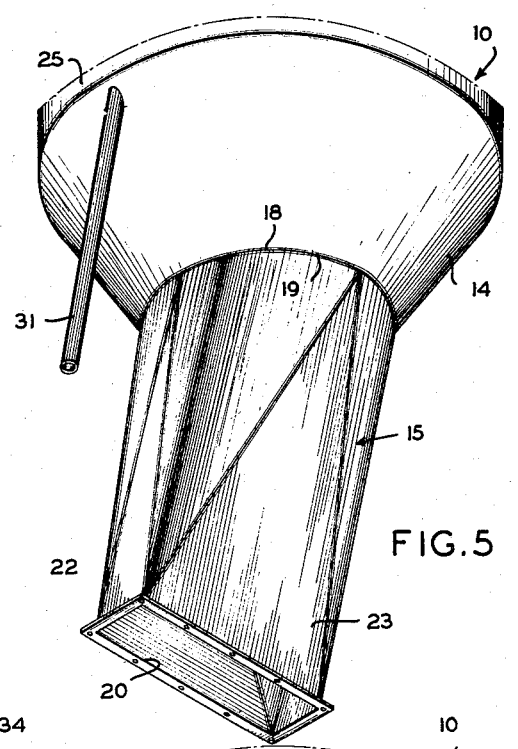
Figure 6:
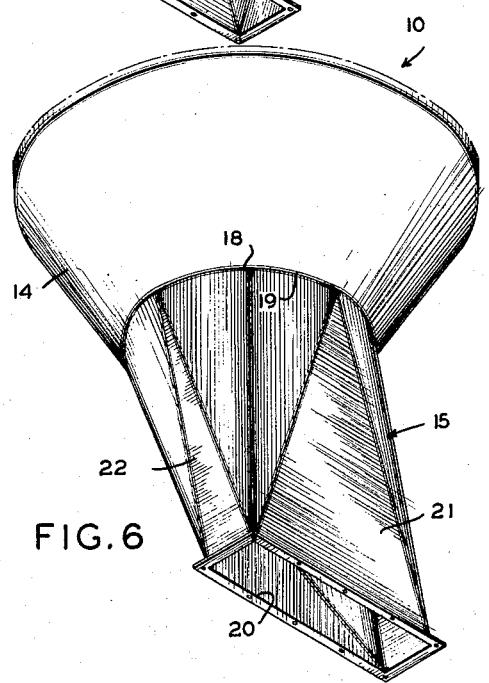
Figures 2, 3, 4:
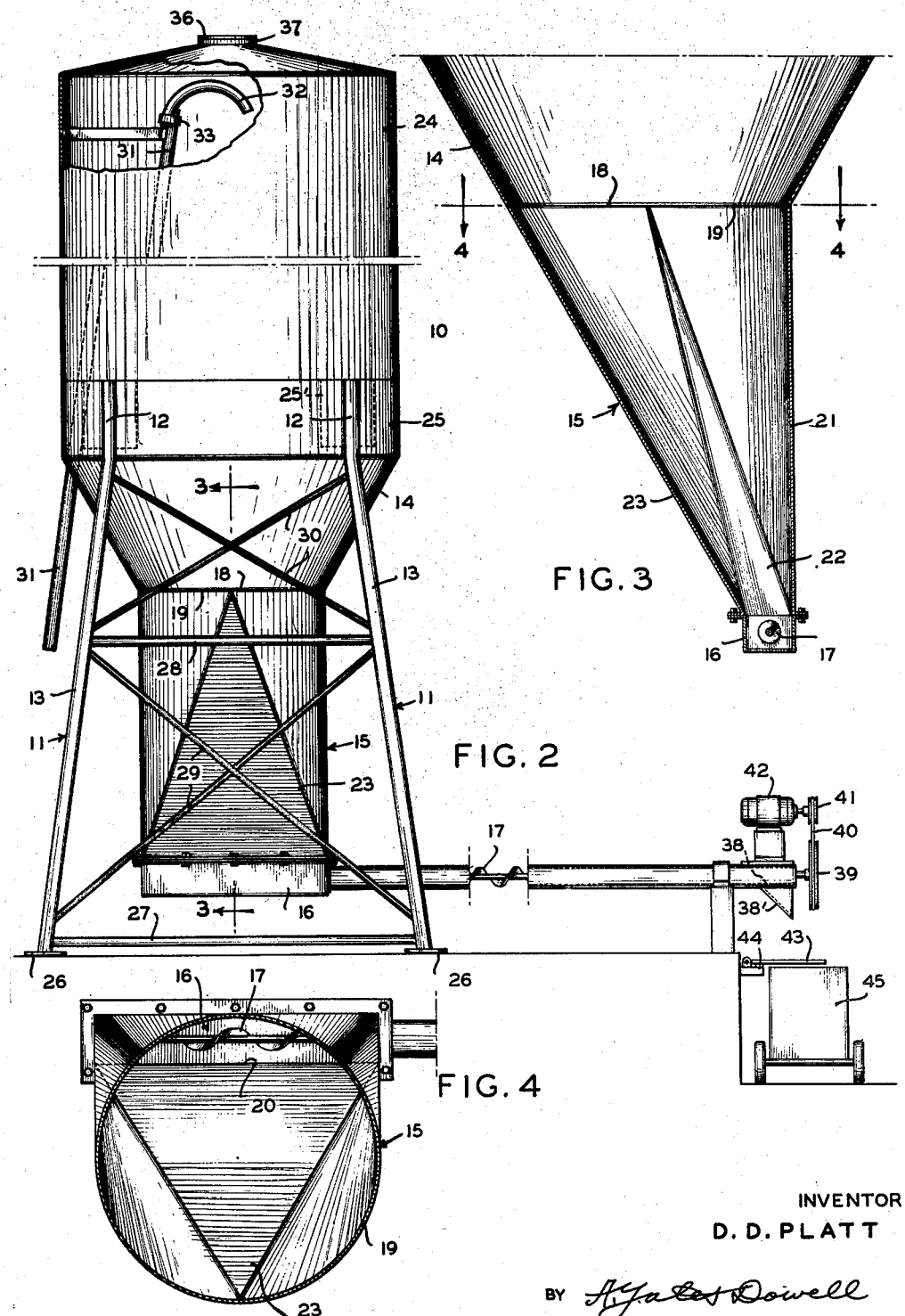

Other objects and advantages of the invention will be apparent from the following description taken in conjunction with the accompanying drawings, wherein:

Fig. 1 is a side elevation illustrating one application of the invention;

Fig. 2, a front elevation of the device of Fig. 1;

Fig. 3, an enlarged fragmentary section on line 3—3 of Fig. 2;

Fig. 4, a horizontal section on line 4—4 of Fig. 3;

Fig. 5, a fragmentary perspective looking upwardly at the front of the discharge trough and reducing collar with parts omitted for clarity, and Fig. 6, a fragmentary perspective looking upwardly at the rear of the discharge trough and reducing collar with parts omitted for clarity.

Briefly stated, the bulk feed bin of the present invention is an upright cylinder of sufficient height or axial length to provide a pressure head at the lower portion of the same, a frusto-conical reduction collar at its lower end the wall of which is disposed at an angle of 60 degrees and with an axial length of 3½' and terminating in a concentric substantially smaller circular discharge opening. Beneath the reduction collar is attached a discharge funnel having its upper end circular and of a size corresponding to that of the small end of the reduction collar and with its lower end in the form of a rectangle of a length corresponding to the diameter of its upper end but substantially smaller in width and with the center of one side of such rectangular discharge end in a vertical line through one side of the discharge funnel and with an inclined wall extending from such circular top to the lower end of the discharge funnel whereby when the bin is filled the relation of the pressure head of the material and the reduction collar and the discharge funnel will be such that a substantial pressure will be exerted along the central portion or axis of the bin which will cause the material to move downward by gravity through the lower end of the discharge funnel into a screw conveyor and be laterally conveyed and discharged by the operation thereof.

With continued reference to the drawings, the present invention is a bin or silo type structure in the form of an upright cylinder or container 10 supported by four legs or corner posts 11 welded or otherwise secured to the lower portion of the cylinder, such legs having relatively short vertical portions 12 in contact with the cylinder and longer angular portions 13 therebeneath.

The upright cylinder is of sufficient height to cause a pressure head to be exerted in the lower central portion of the same, a height of 18' having been found adequate for such cylinder and a diameter of 9'. Below the cylinder is disposed a frusto-conical reducing collar 14 beneath which is attached a discharge funnel 15 emptying into an elongated housing 16 containing a screw conveyor 17.

The wall of the reducing collar 14 is at a 60 degree angle in order that there will be a minimum of the material remaining on such wall. A suitable axial length of the reducing collar has been found to be 3½' so that the circular opening 18 at the lower end of the reducing collar will be 5' in diameter and the radius of the container reduced to 2'.

The discharge funnel, the axial length of which is 7'2", has a circular opening 19 which is 5' in diameter at its upper end and its lower end has an opening 20 in the form of a rectangle 5' in length and 10" in width with the center of one side of such opening located in a vertical line extending through the circular opening in its upper end and the lower end of the reducing collar. Since the center of one side of the discharge funnel is in a vertical line a relatively flat triangular portion 21 is produced in the form of an isosceles triangle the apex of which is located at the top of the discharge funnel and the base of the isosceles triangle being defined by the side of the rectangular opening 20.

Similar flat triangular portions 22 are provided at each end of the rectangular discharge end portion of the discharge funnel and on the opposite side of the rectangular discharge end an additional isosceles triangle 23 is provided. From all of such triangles the metal of the discharge funnel is rounded to provide a gradual transition between the upper circular end and the lower rectangular end.

In the production of the bin or cylinder four 4' sections 24 may be employed with one 2' lowermost section 25 of slightly heavier material, the upper sections being, for example, of 14-gauge metal and the lower section of 10-gauge metal. Stiffening plates 25' are disposed within the lower section so that when the upper ends of the legs are welded to the lower portion of the cylinder reinforcement will be provided.

The legs are mounted on feet 26 which rest on suitable foundations and such legs are connected by two sets of spaced horizontal angular braces 27 and 28. Also diagonal braces 29 are provided between the horizontal braces and diagonal rods 30 are employed to connect the posts above the upper horizontal braces.

The tank is adapted to be filled pneumatically through a 4" tube 31 which extends upwardly through the reducing collar and the tank to near the top of the tank where it terminates and has attached thereto a deflector 32 which may be in the form of half of a tire casing secured by a clamp 33, so that when the material is introduced it will be deflected downwardly and not allowed to impinge directly against the top or side of the tank. An air vent 34 is provided preferably 6" or larger in diameter, and this air vent is connected by a gooseneck 35 to the top of the tank and extends downwardly along the exterior of the tank. The tank is provided with a cover 36 and a manhole 37 to afford access to its interior.

The screw conveyor housing 16 is disposed substantially horizontally beneath the hollow end of the discharge funnel and such housing extends to the point of discharge and has an opening 38 in its lower side with a spout or guard 39 to permit discharge therefrom. The screw conveyor 17 within the housing 16 has its remote end extending exteriorly of the housing and is provided with a pulley 39 driven by a belt 40 from a pulley 41 connected to a motor 42 suitably controlled as for example by an arm 43 beneath the end of the conveyor.

The arm 43 closes a switch 44 connected in series with the motor 42 and when sufficient material has been discharged into a wheelbarrow 45 or other vehicle to raise the arm, the switch will be opened and the motor stopped.

In the operation of the device, the central core of the material in the cylinder will form a pressure head to feed the material downwardly by gravity. The substantially vertical wall of the discharge funnel will prevent any tendency of the material to form a bridge and the pressure head pressing downwardly against the discharge funnel will provide a continuous flow of material to the screw conveyor therebeneath. As material is removed from the bin, the central core will be lowered and the material around the periphery will flow by gravity into the cavity left by the lowering of the central core. Due to the steep angularity of the walls, little or no material will cling to the inside of the bin.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A bulk feed bin comprising an upright cylinder of a length substantially greater than its diameter and with an inverted frusto-conical reducing collar depending from its lower end, said reducing collar being disposed axially of said cylinder with its wall at an angle of 60° and terminating in a circular opening, a discharge funnel depending from the circular opening in said reducing collar and terminating in an offset rectangular lower discharge end the length of which corresponds substantially to the diameter of the upper end of said discharge funnel and with the side of the rectangular opening in a vertical line extending through the upper end of said discharge funnel whereby material within the bin will provide a pressure head and the material forming the core of the cylinder will move downwardly by gravity and subsequently the adjacent material around the wall of the cylinder will move downwardly, and a screw conveyor beneath said discharge opening for moving material laterally to a place of discharge, power means for driving said screw conveyor and control means for said power means.

2. A bulk feed bin comprising an upright wall such that when material is contained therein a pressure head will be within its lower extremity, a frusto-conical reducing collar having a wall disposed at a 60° angle beneath said upright wall and with an opening at the lower end thereof centrally of said upright wall, a discharge funnel extending downwardly from such opening, said discharge funnel having its upper end connected to the reducing collar and coinciding with the opening therein, said discharge funnel having a lower end terminating in a rectangular opening of a length corresponding to the diameter of the opening in its upper end and with one side of the rectangular opening in a vertical line extending through the opening in the upper end of said discharge funnel whereby material within said tank will exert pressure along a central core downwardly within said reducing collar and in said discharge funnel and due to its angularity and the relatively short length of said reducing collar the material in the tank will not remain on the wall thereof.

3. A bulk feed bin comprising upright wall storage means, a frustoconical reducing collar connected to the bottom of said upright storage means and having relatively steep wall means terminating in a central opening at its lower end, a discharge funnel having its upper end co-extensive with the lower end of said collar and extending downwardly from said central opening, said discharge funnel being relatively long compared to said collar and having its lower end terminating in an elongated generally rectangular opening, said rectangular opening having a length substantially the width of the upper end of said funnel, said discharge funnel having a substantially vertical wall portion extending from its upper end to one side of said rectangular opening and other substantially vertical wall portions extending from said upper end to each end of said rectangular opening at the lower end of said funnel, the remainder of the wall of said discharge funnel being relatively steep and smoothly connecting its upper and lower ends.

References Cited in the file of this patent

UNITED STATES PATENTS 2,347,437   Saxe _____ Apr. 25, 1944